United States Patent
Duponchel et al.

(10) Patent No.: US 7,908,350 B2
(45) Date of Patent: Mar. 15, 2011

(54) METHODS FOR OPERATING VIRTUAL NETWORKS, DATA NETWORK SYSTEM, COMPUTER PROGRAM AND COMPUTER PROGRAM PRODUCT

(75) Inventors: Yann Duponchel, Kilchberg (CH); James F. Riordan, Rueschilkon (CH); Ruediger Rissmann, Adliswil (CH); Diego M. Zamboni, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/097,349

(22) PCT Filed: Dec. 12, 2006

(86) PCT No.: PCT/IB2006/054764
§ 371 (c)(1),
(2), (4) Date: Sep. 12, 2008

(87) PCT Pub. No.: WO2007/069194
PCT Pub. Date: Jun. 21, 2007

(65) Prior Publication Data
US 2009/0006603 A1      Jan. 1, 2009

(30) Foreign Application Priority Data
Dec. 13, 2005   (EP) ..................... 05112038

(51) Int. Cl.
*G06F 15/173* (2006.01)
*G06F 15/177* (2006.01)
(52) U.S. Cl. .................. 709/221; 709/226; 709/249
(58) Field of Classification Search .......... 709/221, 709/226, 249
See application file for complete search history.

(56) References Cited

U.S. PATENT DOCUMENTS
6,560,236 B1 * 5/2003 Varghese et al. ............ 370/401
(Continued)

FOREIGN PATENT DOCUMENTS
EP       0 952 755 A2 * 10/1999
(Continued)

*Primary Examiner* — Patrice L Winder
(74) *Attorney, Agent, or Firm* — William Stock; Anne Vachon Dougherty

(57) ABSTRACT

The invention relates to a method for operating virtual networks. The method comprises providing a first virtual network comprising a first set of network ports assigned to a first virtualization tag (T1) and a second virtual network comprising a second set of network ports assigned to a second virtualization tag (T2), the first and the second virtual network having compatible address ranges and being adapted to only pass data packets within them, providing a first network node having a source address (SA) in the first virtual network and being operationally connected to a first port (P1) assigned to the first virtual network by means of the first virtualization tag (T1), monitoring the first network node in order to detect a predetermined condition, and, on detection of the predetermined condition, reassigning the first port (P1) to the second virtual network by means of assigning the second virtualization tag (T2) to the first port (P1), such that no data packet can be passed from the first network node (N1) to a second network node (N2) connected to a second port (P2) assigned to the first virtual network by means of the first virtualization tag (T1) directly and keeping of the source address (SA) for the first network node (N1) in the second virtual network (104). The invention further relates to a further method for operation virtual networks, a data network system and a computer program product adapted to perform the inventive methods.

10 Claims, 4 Drawing Sheets

U.S. PATENT DOCUMENTS

| | | | |
|---|---|---|---|
| 6,937,574 B1 * | 8/2005 | Delaney et al. | 370/254 |
| 7,272,643 B1 * | 9/2007 | Sarkar et al. | 709/222 |
| 7,411,975 B1 * | 8/2008 | Mohaban | 370/466 |
| 7,525,969 B2 * | 4/2009 | Grant | 370/392 |
| 7,672,314 B2 * | 3/2010 | Elangovan | 370/254 |
| 7,715,380 B2 * | 5/2010 | Somasundaram | 370/389 |
| 2002/0126681 A1 * | 9/2002 | Kazban et al. | 370/409 |
| 2004/0010618 A1 * | 1/2004 | Thomas | 709/245 |
| 2005/0066035 A1 * | 3/2005 | Williams et al. | 709/226 |
| 2006/0075484 A1 * | 4/2006 | Yang | 726/15 |
| 2007/0081542 A1 * | 4/2007 | Kazban et al. | 370/397 |

FOREIGN PATENT DOCUMENTS

WO     WO 97/18657 A1 *   5/1997

* cited by examiner

METHODS FOR OPERATING VIRTUAL NETWORKS, DATA NETWORK SYSTEM, COMPUTER PROGRAM AND COMPUTER PROGRAM PRODUCT

TECHNICAL FIELD

The present invention relates to methods for operating virtual networks with a first virtual network comprising a first set of network ports assigned to a first virtualization tag and a second virtual network comprising a second set of network ports assigned to a second virtualization tag, the first and the second virtual network having compatible address ranges and being adapted to only pass data packets within them. The invention further relates to a data network system, a computer program and a computer program product adapted to perform the inventive methods.

BACKGROUND OF THE INVENTION

A virtual network is a logical segment of a physical network, in particular of a local area network (LAN). For example, virtual local area networks (VLANs) are described in the IEEE 802.1q standard, which extends the conventional Ethernet standard IEEE 802.1 by an additional packet header which comprises, among others, a VLAN identification tag. Switches and other active network components, which are compatible with the IEEE 802.1q standard only pass data packets through a network port that is configured to a VLAN with a VLAN tag corresponding to the one contained in a packet header.

Virtual networks can be used, for example, to create secure, closed networks within insecure, open networks such as the Internet. In addition, virtual networks can be used to reduce the number of network collisions between data packets and hence improve the network performance.

However, in order to achieve these and similar beneficial objectives, network nodes, for example computers connected to the network, and network equipment, for example switches, should be configured properly. For example, a computer needs a valid and unique address within an virtual network. In addition, the computer should be be configured with valid addresses of important service nodes such as mail or web servers, for example. Switches, routers and other network equipment need to be configured with proper virtual network port assignments, among other. Such a configuration process is tedious and error-prone.

As a consequence, only few virtual networks are configured by network administrators in practice. In addition, network nodes are hardly ever moved from one virtual network to another. This is in contrast to some of the objectives that could be achieved by virtual networks, for example isolating misbehaving network nodes or adjusting virtual networks to changing performance requirements.

Consequently, there exists a need for improved methods for operating virtual networks and data network systems.

SUMMARY OF THE INVENTION

According to one aspect of the invention, a method for operating virtual networks is provided. The method comprises providing a first virtual network comprising a first set of network ports assigned to a first virtualization tag and a second virtual network comprising a second set of network ports assigned to a second virtualization tag, the first and the second virtual network having compatible address ranges and being adapted to only pass packets within them. The method further comprises the step of providing a first network node having a source address in the first virtual network and being operationally connected to a first port assigned to the first virtual network by means of the first virtualization tag, monitoring the first network node in order to detect a predetermined condition, and on the detection of the predetermined condition, reassign the first port to the second virtual network by means of assigning the second virtualization tag to the first port, such that no data packet can be passed from the first network node to a second network node connected to a second port assigned to the first virtual network by means of the first virtualization tag directly and keeping of the source address for the first network node in the second virtual network.

By assigning a second virtualization tag to a given first port, the first network node can be moved from the first virtual network to the second. Because the first and the second virtual network have compatible address ranges and because the network address of the first network node is kept the same in the second virtual network, moving the first network node from the first virtual network to the second virtual network is transparent to the first network node. Consequently, the configuration of the first network node does not need to be changed. Thus, a network node can be moved from one virtual network to another, for example to isolate the first network node from the first virtual network.

According to an advantageous embodiment of the first aspect of the invention, the predetermined condition is given by a state transition of a state machine from a first state to a second state and each state of the state machines is associated with an assignment for each network port to a virtualization tag.

By using a state machine for detecting the predetermined condition, a multiplicity of configurations of virtual networks can be created and associated with states of the state machine. For example, events like the occurrence of a network fault or a network administrator-initiated action can be used to trigger a state transition and thus a new configuration of the virtual networks.

According to a second aspect of the present invention a method for operating virtual networks is provided. The method comprises the steps of providing a first virtual network comprising a first set of network ports assigned to a first virtualization tag and a second virtual network comprising a second set of network ports assigned to a second virtualization tag, the first and the second virtual network having compatible address ranges and being adapted to only pass data packets within them. The method further comprises the steps of providing an address translator, being operationally connected to a first translator port assigned to the first virtual network by means of a first virtualization tag and a second translator port assigned to a second virtual network by means of the second virtualization tag, sending a data packet comprising a packet header with a destination address by a transmitter node connected to a transmitter port of the second virtual network, marking the data packet by the transmitter port with a second virtualization tag, determining, if a destination node with a destination address of the packet header is comprised in the second virtual network, and, on detecting that the destination node is not comprised in the second virtual network, redirecting the data packet to a receiver comprised in the first or second virtual network for further processing by transmitting the data packet to the first or second translator port assigned to the first or second virtualization tag, respectively, through the address translator.

By connecting the first and second virtual network by means of an address translator with a network port in each virtual network, data packets can be routed from one virtual network to the other. Consequently, it is possible to redirect data packets from a transmitter node placed in the second network to a receiver node placed in either the first or the second virtual network. This allows, among others, to successfully respond to requests from the translator node to a receiver node, in case the transmitter node has previously been moved from the first virtual network to the second virtual network.

According to a preferred embodiment of the second aspect of the invention, the receiver node is comprised in the first virtual network, and in the step of redirecting, a source address comprised in the packet header is changed to a first translator address assigned to the address translator in the first virtual network and the modified data packet is sent to the first translator port for transmission to the receiver node.

By changing the source address of a packet header, an associated data packet which is transmitted from the first translator port remains valid within the first virtual network, even though it originated from the transmitter node in the second virtual network. Such behaviour can be achieved, for example, by use of network address translation devices.

According to a further preferred embodiment of the second aspect of the invention, the receiver node is comprised in the second virtual network and has a receiver address, and, in the step of redirecting, the destination address comprised in the packet header is changed to the receiver address and the modified data packet is sent to the second translator port for transmission to the receiver node.

By changing the destination address and retransmitting the changed data packet within the second virtual network, a request from the transmitter node can be redirected to a new receiver node comprised in the second virtual network transparently.

According to a further preferred embodiment of the second aspect of the present invention, the receiver node is a proxy node specific to an application protocol.

By providing application specific proxy nodes, requests included in a data packet transmitted from a transmitter node can be redirected to that proxy instead of the original destination address. This allows, for example, to handle data packets sent from a transmitter node isolated in a second virtual network differently than data packets originating in the first virtual network.

According to a third aspect of the present invention, a data network system comprising a switch comprising a multiplicity of ports, each port being assigned to a virtual network by means of corresponding virtualization tag, an address translator, being operationally connected to a first translator port of the switch assigned to the first virtual network by means of the first virtualization tag and a second translator port of the switch assigned to the second virtual network by means of the second virtualization tag, and a first network node having a source address and being operationally connected to a first port assigned to the first virtual network by means of the first virtualization tag is provided, wherein data network system is adapted to perform a method according to the first aspect of the invention.

By providing a data network system with an address translator operationally connected to a first and second virtual network, a first network node can be moved from the first virtual network to the second virtual network without the need to reconfigure the first network node.

According to a preferred embodiment of the third aspect, the data network system further comprises a second network node operationally connected to the first virtual network or a third network node operationally connected to the second virtual network, whereby the data network system is further adapted to perform a method according to the second aspect of the invention.

By providing a second or third network node either in the first or second virtual network, a data packet transmitted from a first network node can be redirected to the second network node in the first or a third network node in the second virtual network.

According to a fourth aspect of the present invention, a computer program comprising program instructions adapted to perform all of the steps of a method according to the first or second aspect of the present invention is provided.

According to a fifth aspect of the invention a computer program product comprising a computer-readable medium embodying program instructions executable by at least one processor to perform all of the steps of a method according to the first or second aspect of the invention is provided.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE DRAWINGS

Figure 1A:
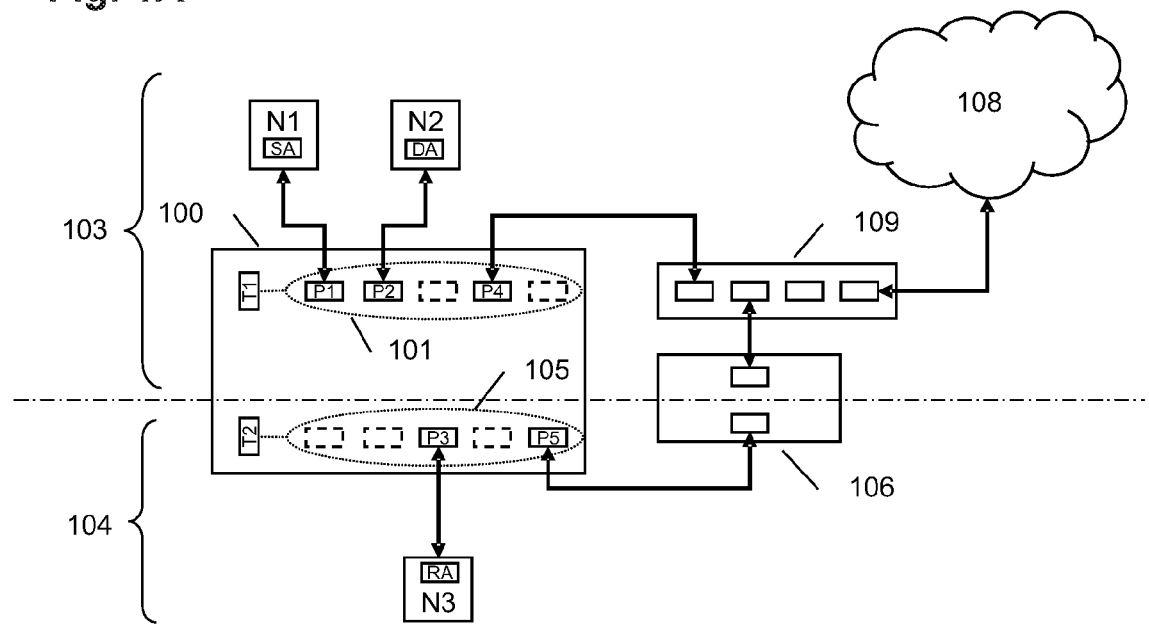
FIG. 1A, a schematic network setup comprising a first and second virtual network, wherein a first network node is comprised in the first virtual network, FIG. 1B, a schematic network setup comprising a first and second virtual network, wherein a first network node is comprised in the second virtual network, FIG. 2, a schematic internal setup of an address translator, FIG. 3, a schematic state diagram of a finite state machine determining the virtual network configuration, FIG. 4, a flowchart of an embodiment of the first method for operating virtual networks, and FIG. 5, a flowchart of an embodiment of the second method for operating virtual networks.

FIG. 1A shows a schematic network setup comprising a first virtual network 103 and a second virtual network 104. The setup comprises a switch 100, a router 109 and an address translator 106. The switch 100 comprises five ports, P1, P2, P3, P4 and P5, which can be assigned to the first virtual network 103 by means of a first virtualization tag T1 or to the second virtual network 104 by means of a second virtualization tag T2. In the given example, a first set 101 of network ports comprises the ports P1, P2 and P4 that are assigned to the first virtualization tag T1. The network ports P3 and P5 are assigned to a second set 105 of network ports.

Using a network switch 100 as described in the outset, each data packet received by any of the network port P1, P2 or P4 assigned to the first virtual network 103 will be marked with the first virtualization tag T1, while data packets received from the network ports P3 and P5 will be marked with the second virtualization tag T2. Inversely, no data packet marked with the first or second virtualization tag T1 or T2 will be delivered through network ports associated with a non-matching virtualization tag.

The network setup comprises three network nodes N1, N2 and N3 connected to the network ports P1, P2 and P3 and having a source address SA, a destination address DA and a receiver address RA, respectively. In the given example, the network node N1, N2 and N3 are computers connected to the switch 100. In general any type of network appliance can be connected to the network ports P1, P2 and P3. In addition, the router 109 is connected to an external network 108, for example the Internet.

Because the network nodes N1, N2 and N3 can not read, set or otherwise manipulate the network tags T1 or T2 applied by the network ports P1 to P5 themselves, no data packets can be sent directly from the network node N3 to the network nodes N1 or N2, for example.

The address translator 106 is connected to the first virtual network 103 by means of the router 109 to a first address translator port P4 of the switch 100. In addition, the address translator 106 is connected by means of a second address translator port P5 to the second virtual network 104. In the given example, the address translator 106 is an external network address translation NAT device. In practice, however, the address translator 106 may be an integral part of the switch 100, in which case the first and second translator port (P4, P5) may not be physical connections but rather logical ports. As far as this application is concerned, it suffices that the address translator can transmit and receive data packets in both virtual networks 103 and 104.

According to the presented example, a predetermined condition is detected for network node N1. Such a condition can be, for example, a virus or worm infection of the network node N1, a crash or other partial or complete malfunction of the network node N1, an activation of an intrusion prevention system (IPS) or any other condition such as high or low network traffic or request to unusual addresses that might be responded to by reconfiguring the network setup. Of course it is also possible to manually trigger such a condition, for example on request of a network administrator.

The monitoring of the predetermined condition can be performed by the node N1 itself, for example by a virus detection program or performance monitor, by one or several pieces of the network equipment, for example the switch 100, the router 109 or the address translator 106, or by an external device such as a firewall or network performance monitor not shown in FIG. 1A.

Figure 1B:
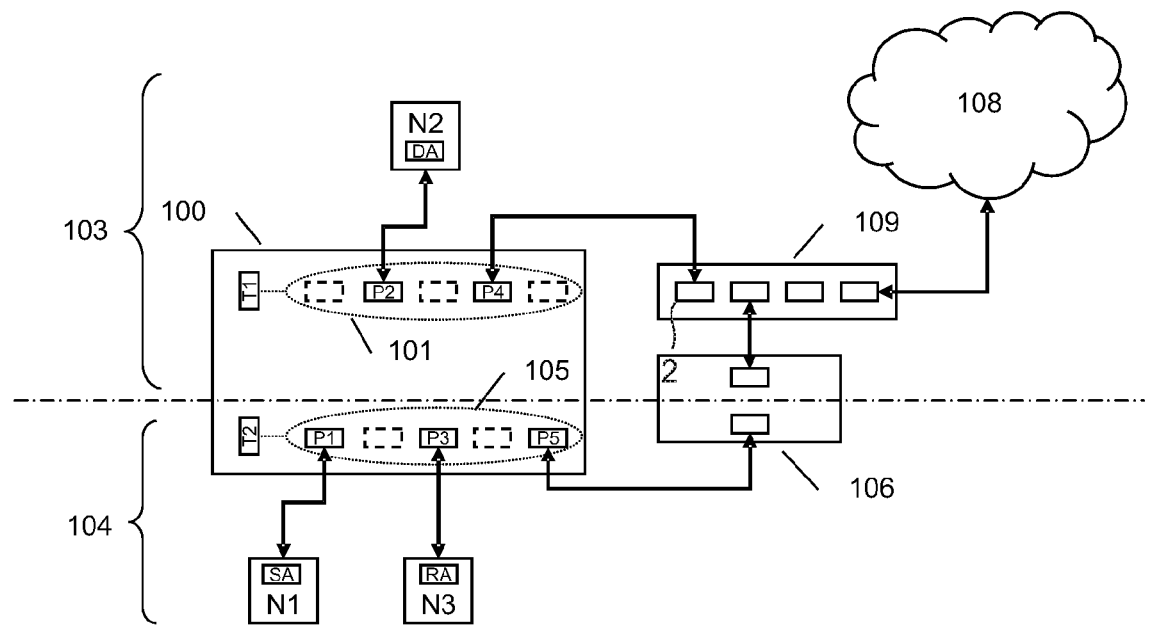

FIG. 1B shows a similar schematic network setup comprising a first and second virtual network 103 and 104 respectively. Compared to the configuration shown in FIG. 1A, the setup shown in FIG. 1B differs in that the network port P1, to which the network node N1 is connected, is now assigned to second virtualization tag T2 such that the network node N1 now belongs to the second virtual network 104.

By logically moving the first network node N1 from the first virtual network 103 to the virtual second network 104, a threat detected by monitoring the predetermined condition can be avoided. In this example the first virtual network 103 is considered a production state virtual network with full access to other network nodes N2 or the external network 108, while the second virtual network 104 is considered an isolation network, with limited access to other network resources.

For example, if a virus infection is detected on the network node N1, the network node can be moved quickly to the second virtual network, thus avoiding infection of the second network node N2 connected to the first virtual network 103. Similarly the network node N1 can be isolated from the external network 108 to prevent the transmission of potentially classified information from the network node N1 to the external network 108.

Figure 2:
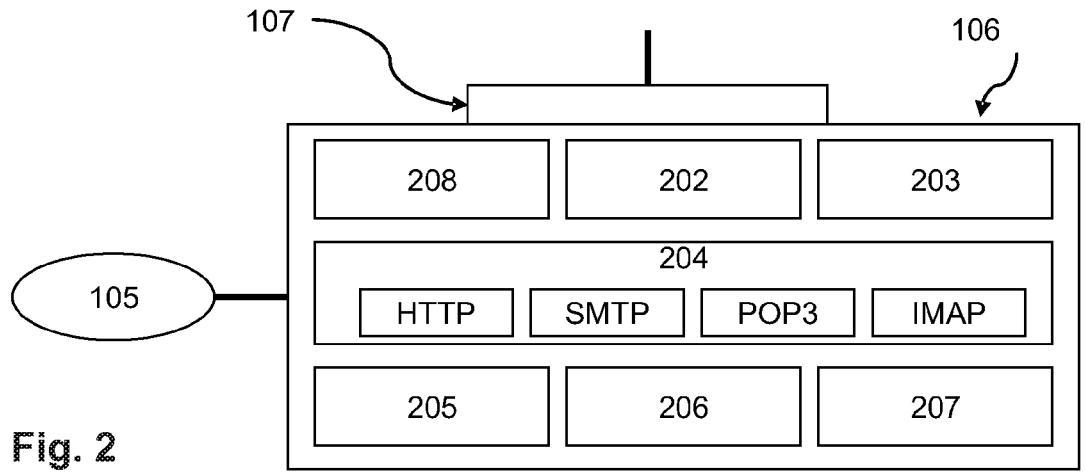

FIG. 2 shows the internal setup of the address translator 106. The address translator 106 comprises an external address 107 for use with the first translator port P4 assigned to the first virtual network 103. All other internal components of the address translator 106 are assigned to addresses of the second virtual network 104 by means of the second virtualization tag T2, which means that they are accessible to network nodes connected to ports of the second set 105 of network ports.

In the given example, the address translator comprises internal proxies 204, assigned to different application level protocols such as HTTP, SMTP, POP3 and IMAP. The proxies 204 can selectively respond to or forward application requests to the specific protocols. In addition, the address translator 106 comprises a patch server 205, a disinfection server 206, and a reconnection initiator 207.

The patch server 205, the disinfection server 206 and the reconnection initiator 207 can be used to provide services to the second virtual network 104 specific to network nodes comprised in it. For example, if the second virtual network 104 is used to isolate the first network node N1 that has been infected by a virus or other malicious program, the disinfection server 206 can be used to remove the virus, the patch server 205 can be used to install security updates to software running on the network node N1 to prevent future infections, before the reconnection initiator 207 is used to move the disinfected network node N1 back to the first virtual network 103.

The address translator 106 further comprises an address mapping module 208, which can associate addresses of network nodes of the second virtual network 104 with data packets sent to the first virtual network 103 using the external address 107 of the address translator 106 in the first virtual network 103. For example, a so-called network address translation device (NAT) can be used to connect the first virtual network 103 with the second virtual network 104. Conventionally, network address translation devices are used to connect a private network 104 with an external network 108 such as the Internet using only a single externally visible address 107.

The address translator 106 further comprises a filtering module 202 and an authentication module 203. The filtering module 202 can be used to restrict the address mapping performed by the address mapping module 208 to a predefined set of applications or addresses. The filtering can also be made dependent upon authentication of a particular request, for example by verifying a user name and password provided to the authentication module 203 prior to a request.

Although the address translator 106 is shown as a separate component comprising a number of internal proxies 204, servers 205, 206 and 207 and other modules 202, 208 an 203, the address translator 106 may be a part of the switch 100, the router 109 or a combination thereof Equally, the internal components 202 to 208 of the address translator 106 may be implemented as separate units, either in hard- or software.

Figure 3:
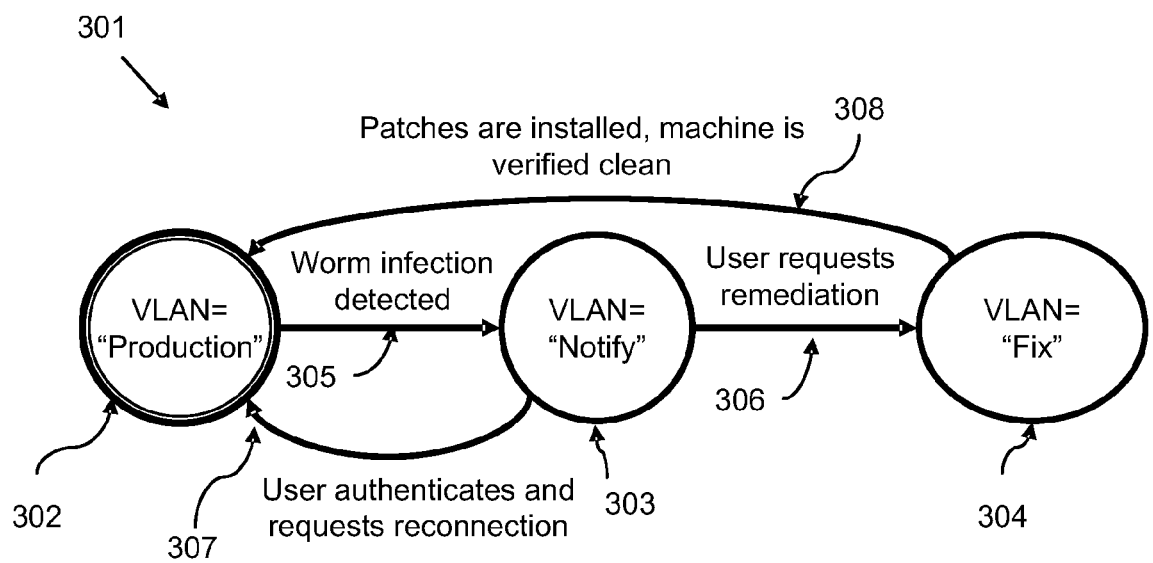

FIG. 3 shows a schematic state diagram of a finite state machine 301 determining the state of a single network port P1. Initially, the network port P1 is in a production state 302 associated with a first virtual network 103. In this state, the node N1 connected to the network port P1 has full access to other nodes N2 in the first virtual network 103 or the external network 108.

Once a worm or virus infection is detected, the network port P1 is switched to a notify state 303 associated with a second virtual network 104 by means of a state transition 305. In this state, a user or network administrator of the network node N1 may be informed about the infection.

The user or administrator can then request reconnection to the first virtual network 103 associated with the production state 302 by means of a state transition 307, for example after a manual verification that the network node N1 does not pose a threat to the first virtual network 103 and successful authentication.

Alternatively the user or administrator can request to be transferred into a fixed state 304 associated with a third virtual network by means of a further state transition 306. In the fixed state 304, the network node N1 might be granted access to services used to remove the virus infection, for example to the disinfection server 206 or the patch server 205. After installing patches and verifying that the virus infection has been removed from the network node N1, the first virtualization tag can be assigned to the port P1 again returning the first node N1 to the first virtual network 103 associated with the production state 302 by means of state transition 308.

By using a state machine 301 to monitor for predetermined conditions and assign virtualization tags T1 or T2 to the ports P1 to P5 of a switch 100, a multiplicity of virtual networks 103 and 104 can be easily created, monitored and configured. Consequently, a network node N1 can be moved automatically from one virtual network 103 to another virtual network 104 as long as the address spaces of the different virtual networks are compatible, such that the move is transparent to the network node N1 itself.

Because the state transitions available depend on the state the state machine 301 is in, the predetermined condition to check for can be defined in a context-sensitive manner. For example, a network node N1, which is already in a virtual network 104 associated with the notify state 303, does not need to be monitored for viruses anymore.

The state machine 301 does not need to be finite as shown in the simple example of FIG. 3. Especially in large networks autonomous agents may be used in order to automatically define new states and thus virtual networks, for example for automatic separation of logically unrelated network resources, which are physically connected to a single network. Such a automatic configuration may be used, for example, for performance optimization or for improving network security.

The states and state transitions of a state machine 301 can thus be used to encode the configuration of an entire network.

Figure 4:
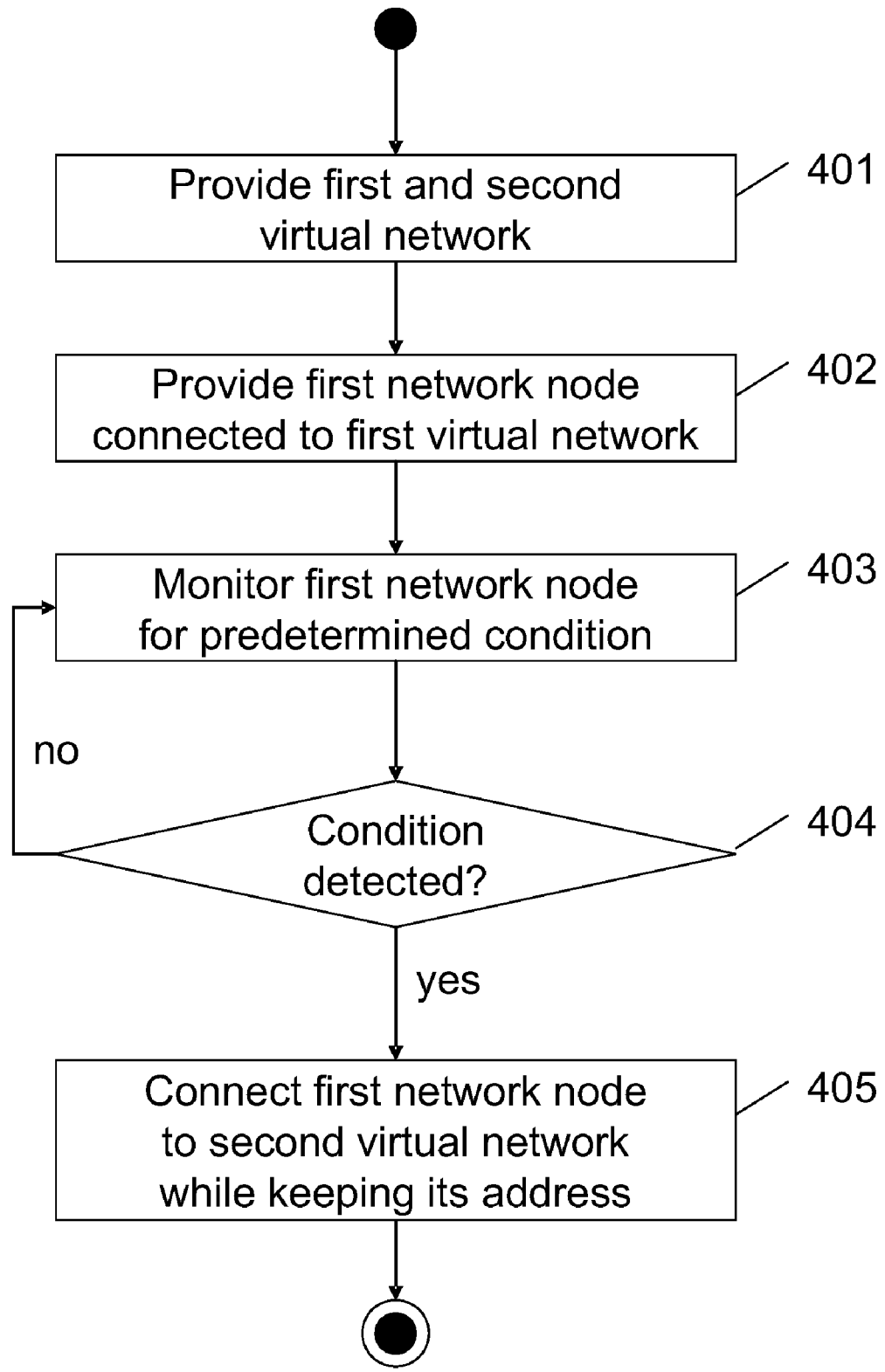

FIG. 4 shows a flowchart of an embodiment of the first method for operating virtual networks. In a first step 401, a first virtual network 103 comprising a first set 101 of network ports assigned to a first virtualization tag T1 and a second virtual network 104 comprising a second set 105 of network ports assigned to a second virtualization tag T2, the first and the second virtual network 103 and 104 having compatible address ranges and being adapted to only pass packets within them, is provided.

In a second step 402, a first network node N1 having a source address SA in the first virtual network 103 and being operationally connected to a first port P1 assigned to the first virtual network 103 by means of the first virtualization tag T1 is provided. For example, the first virtual network 103 can be used to comprise all network nodes N1, N2 that are in a normal operation condition.

In a step 403 the network node N1 is monitored for a predetermined condition. Such a condition might be, for example, the detection of a worm or virus, the detection of unusually high or low network traffic from or to the first node N1 or similar symptoms associated with a misbehaving network node N1.

If no such condition is detected in a step 404, the monitoring of the network node N1 continues in step 403. If, however, such a condition is detected in step 404, the method continues with the step 405.

In the step 405, the network port P1, through which the network node N1 is connected with the switch 100, is assigned to a second virtualization tag T2 associated with the second virtual network 104. Consequently, the network node N1 is moved from the first virtual network 103 to the second virtual network 104. The configuration of the network node N1, however, is kept the same. In particular, the network address SA of the network node N1 was used in the first virtual network 103 is also used in the second virtual network 104.

If the second virtual network 104 has a compatible address structure to the first virtual network 103, the switch of the first node N1 from the first virtual network 103 to the second virtual network 104 is transparent to the first network node N1. In particular, if similar services associated with predetermined addresses DA are available in the second virtual network 104 that were available in the first virtual network 103, service requests included in data packages sent from the first network node N1 will still be responded to in the second virtual network 104 as before.

Figure 5:
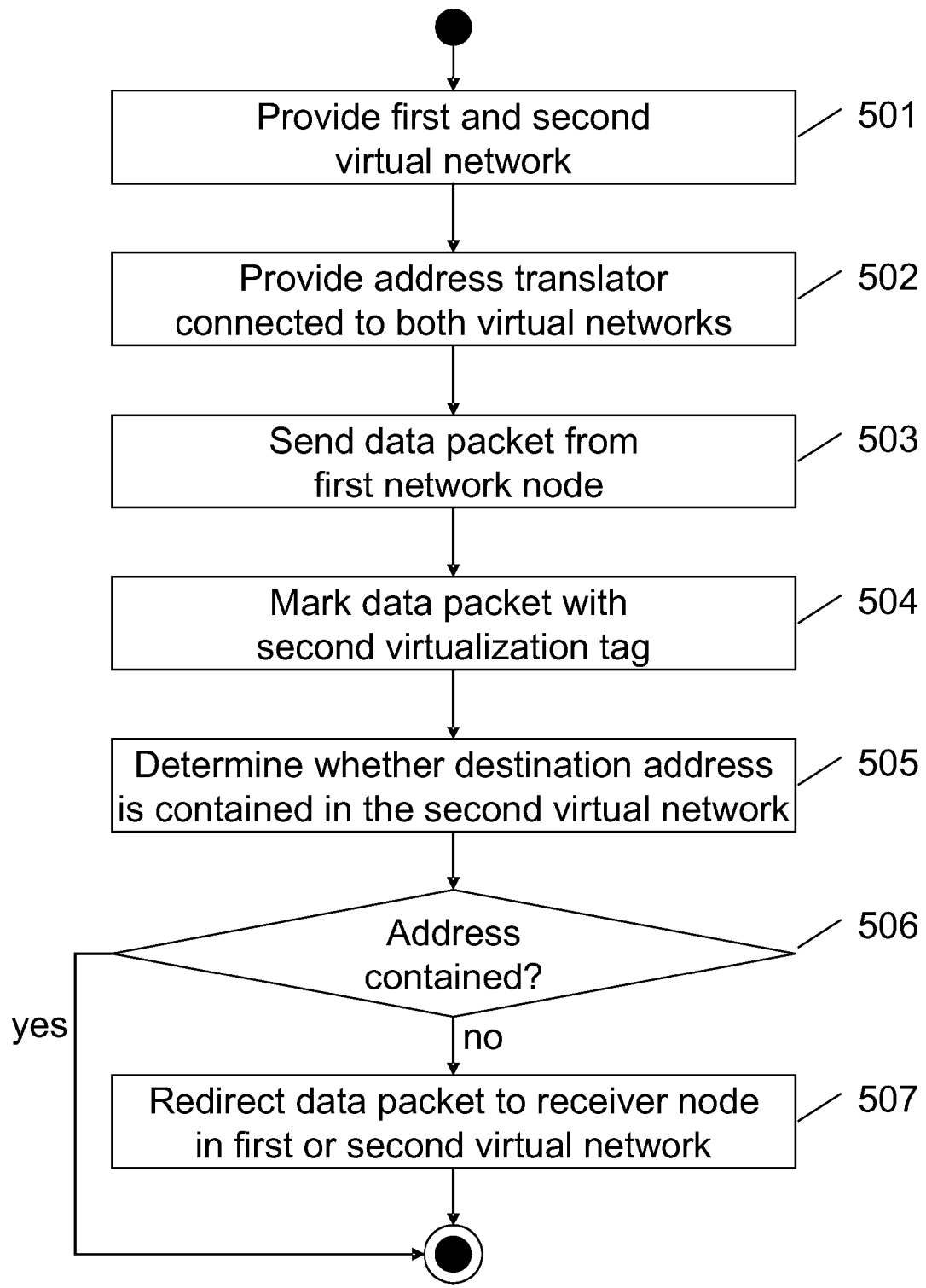

FIG. 5 shows a flowchart of an embodiment of the second method for operating virtual networks. In a first step 501 a first virtual network 103 and a second virtual network 104 are provided. This step is identical to the step 401 described above.

In a step 502 an address translator 106 is provided that is operationally connected to a first translator port P4 assigned to the first virtual network 103 by means of the first virtualization tag T1 and a second translator port P5 assigned to the second virtual network 104 by means of the second virtualization tag T2.

The address translator 106 may be implemented as a separate hardware unit, integrated into another network device such as the switch 100 or the router 109, or may be implemented in software. A computer-readable medium may be provided embodying program instructions of a program executable by a processor comprised in the address translator 106 or the switch 100, for example. The computer-readable medium may, for example, be a CD-ROM, a flash memory card, a hard disk, or any other suitable computer-readable medium.

In a step 503, a first network node N1 connected to a transmitter port P1 assigned to the second virtual network 104 sends a data packet comprising a packet header with a destination address DA. The data packet could be sent, for example, from a source address SA of the transmitter node N1 to the destination address DA of a second network node N2 as shown in FIG. 1B.

In a step 504 the data packet is marked with the second virtualization tag T2 by the transmitter port P1.

In the example shown in FIG. 1B, the second network node N2 is comprised in the first virtual network 103, for example the production state virtual network. However, the transmitter node N1 has previously been moved to the second virtual network 104, for example to an isolation network after a virus infection has been detected on the transmitter node N1.

In that case, a direct transmission of the data packet from the transmitter node N1 to the node N2 addressed by the destination address DA is not possible, as the port P1 to which the network node N1 is connected belongs to the second set 105 of network ports, whereas the network port P2 connected to the node N2 belongs to the first set 101 of network ports and each set 101 and 105 of ports only passed data packets between port comprised in the same set 101 or 105.

In a step 505, it is determined, whether a network node N2 with the specified destination address DA of the packet header is comprised in the second virtual network 104. This functionality can be performed, for example, by the address translator 106.

If in a step 506 it is determined that the destination address DA is contained in the second virtual network 104 no further action is taken. The data packet is then forwarded to the destination address DA within the second virtual network 104 as normal. If, however, it is determined that the destination address DA is not comprised in the second virtual network 104 as shown in FIG. 1B, the address translator 106 redirects the data packet in a step 507.

The data packet can be redirected to a receiver node N2 or N3 comprised in the first or second virtual network 103 or 104, respectively, for further processing by transmitting the data packet to the first or second translator port P4 or P5. In particular, by retransmitting the data packet through the first translator port P4 assigned to the first virtualization tag T1, the data packet can be moved from the second virtual network 104 to the first virtual network 103.

Consequently, the data packet transmitted from the transmitter node N1 can be delivered to a receiver node N2 that is comprised in a different virtual network. If, however, the delivery of the data packet from the transmitter node N1 to the network node N2 with a given destination address DA is considered to be too dangerous, for example because the transmitter node N1 is deemed to be infected by a virus, the data packet can be redirected to a further network node N3 comprised in the second virtual network 104.

This can be achieved in a particularly easy way if all requests for a specific application service are directed to a fixed destination address DA. For example, the first virtual network 103 might comprise a network node N2 serving requests according to the hyper text transfer protocol (HTTP) at a first given destination address DA.

If an application proxy 204 is comprised in the second virtual network 104 at the same destination address DA, HTTP requests sent from a node N1 comprised in the second virtual network 104 are transmitted to the application proxy 204. The application proxy 204 can then decide whether to forward the received request to the actual network node N2 comprised in the first virtual network 103 or to redirect the data packet to a different receiver address RA.

In general the receiver address RA may be associated with a receiver node N2 in the first virtual network 103, a receiver node N3 in the second virtual network 104, a receiver node in an external network 108 or an internal receiver of the address translator 106. If the address translator is connected to more than two virtual networks, the receiver node could, of course, be comprised in any virtual network connected to the address translator directly or indirectly, for example through further address translators 106 or routers 109.

In a particular interesting embodiment, the data packet is redirected to a receiver node N3 comprised in the second virtual network 104, for example to avoid spreading of a virus infection from the transmitter node N1 to any network node outside the second virtual network 104 used as isolation network.

A special receiver node N3 comprised in proxy 204 of the address translator 106 or otherwise connected to the second virtual network 104 may return a predetermined result to the transmitter node N1. Such a predetermined result may comprise, for example, a warning message telling a user of the transmitter node N1 that the transmitter node N1 might be infected by a virus. Similar warnings might be provided for other application protocols, such as the SMTP, POP3 or IMAP email protocols. Such warning messages may be sent to a user or a network administrator instead.

Alternatively, requests from the transmitter node N1 can be filtered out by a filtering module 202. Other data packets may be forwarded to specific network nodes depending on an authentication of the data packet. For example, a request encoded in a data packet authenticated by a network administrator may be forwarded to a disinfection server 206 or patch server 205, if an authentication module 203 verifies that the network administrator has the required privileges. A similar data packet originating from a user of a transmitter node N1 without such authorization might simply be filtered out by the filtering unit 202.

Although the methods for operating virtual networks were described using an example for isolating a network node N1 in case of a virus infection, similar methods can be used to automatically organize network nodes N1 to N3 into a multiplicity of virtual networks by means of a state machine 301. Such an automatic configuration might be used, for example, to organize network nodes N1 to N3 according to performance requirements.

This and other modifications of the described methods will be obvious to a person skilled in the art without departing from the spirit of the invention. For example, the method can be applied to the multiprotocol label switching (MPLS) protocol in order to achieve similar beneficial effects in a wide area network (WAN).

Equally the network setup shown in FIG. 1A and FIG. 1B is only exemplary and will commonly be more complex in practice. For example, a multiplicity of switches 100 may be connected by several routers 109, address translators 106 or other network devices. In addition, virtual networks 103 or 104 may span several physically separates sites, for example different local area networks of a global company internal network.

The invention claimed is:

1. Method for operating virtual networks, comprising:
providing a first virtual network comprising a first set of network ports assigned to a first virtualization tag (T1) and a second virtual network comprising a second set of network ports assigned to a second virtualization tag (T2), the first and the second virtual networks having compatible address ranges and being adapted to only pass data packets within them,
providing a first network node (N1) having a source address (SA) in the first virtual network and being operationally connected to a first port (P1) assigned to the first virtual network by means of the first virtualization tag (T1),
monitoring the first network node (N1) in order to detect a predetermined condition, and
on detection of the predetermined condition, reassigning the first port (P1) to the second virtual network by means of assigning the second virtualization tag (T2) to the first port (P1), such that no data packet can be passed from the first network node (N1) to a second network node (N2) connected to a second port (P2) assigned to the first virtual network by means of the first virtualization tag (T1) directly and keeping of the source address (SA) for the first network node (N1) in the second virtual network.

2. Method according to claim 1, wherein
the predetermined condition is given by a state transition of a state machine from a first state to a second state and each state of the state machines is associated with an assignment for each network port (P1, P2) to a virtualization tag (T1, T2).

3. Method for operating virtual networks, comprising
providing a first virtual network comprising a first set of network ports assigned to a first virtualization tag (T1) and a second virtual network comprising a second set of network ports assigned to a second virtualization tag (T2), the first and the second virtual networks having compatible address ranges and being adapted to only pass data packets within them, providing an address translator, being operationally connected to a first translator port (P4) assigned to the first virtual network by means of the first virtualization tag (T1) and a second translator port (P5) assigned to the second virtual network by means of the second virtualization tag (T2), sending a data packet comprising a packet header with a destination address (DA) by a transmitter node (N1) connected to a transmitter port (P1) of the second virtual network, marking the data packet by the transmitter port (P1) with the second virtualization tag (T2), determining, if a destination node (N2) with the destination address (DA) of the packet header is comprised in the second virtual network, and on determining that the destination node (N2) is not comprised in the second virtual network, redirecting the data packet to a receiver node (N2, N3) comprised in the first or second virtual network for further processing by transmitting the data packet to the first or second translator port (P4, P5) assigned to the first or second virtualization tag (T1, T2), respectively, through the address translator.

4. Method according to claim 3, wherein,
the receiver node (N2) is comprised in the first virtual network, and
in the step of redirecting, a source address (SA) comprised in the packet header is changed to a first translator address assigned to the address translator in the first virtual network and the modified data packet is sent to the first translator port (P4) for transmission to the receiver node (N2).

5. Method according to claim 3, wherein,
the receiver node (N3) is comprised in the second virtual network and has a receiver address (RA), and
in the step of redirecting, the destination address (DA) comprised in the packet header is changed to the receiver address (RA) and the modified data packet is sent to the second translator port (P5) for transmission to the receiver node (N3).

6. Method according to claim 3, wherein,
the receiver node (N2, N3) is a proxy node specific to an application protocol.

7. Data network system, comprising
a switch comprising a multiplicity of ports, each port being adapted to be assigned to a virtual network by means of a corresponding virtualization tag (T1, T2),
an address translator, being operationally connected to a first translator port (P4) of the switch assigned to the first virtual network by means of the first virtualization tag (T1) and a second translator port (P5) of the switch assigned to the second virtual network by means of the second virtualization tag (T2), and
a first network node (N1) having a source address (SA) and being operationally connected to a first port (P1) assigned to the first virtual network by means of the first virtualization tag (T1),
wherein
the data network system is adapted to perform a method comprising steps of:
monitoring the first network node (N1) in order to detect a predetermined condition, and
on detection of the predetermined condition, reassigning the first port (P1) to a second virtual network by means of assigning a second virtualization tag (T2) to the first port (P1), such that no data packet can be passed from the first network node (N1) to a second network node (N2) connected to a second port (P2) assigned to the first virtual network by means of the first virtualization tag (T1) directly and keeping of the source address (SA) for the first network node (N1) in the second virtual network.

8. Data network system according to claim 7, further comprising
a second network node (N2) operationally connected to the first virtual network or a third network node (N3) operationally connected to the second virtual network,
wherein
sending a data packet comprising a packet header with a destination address (DA) by a transmitter node (N1) connected to a transmitter port (P1) of the second virtual network,
marking the data packet by the transmitter port (P1) with the second virtualization tag (T2),
determining, if a destination node (N2) with the destination address (DA) of the packet header is comprised in the second virtual network, and
on determining that the destination node (N2) is not comprised in the second virtual network, redirecting the data packet to a receiver node (N2, N3) comprised in the first or second virtual network for further processing by transmitting the data packet to the first or second translator port (P4, P5) assigned to the first or second virtualization tag (T1, T2), respectively, through the address translator.

9. Computer program product storing program instructions adapted to perform a method for operating virtual networks, comprising a first virtual network comprising a first set of network ports assigned to a first virtualization tag (T1) and a second virtual network comprising a second set of network ports assigned to a second virtualization tag (T2), the first and the second virtual networks having compatible address ranges and being adapted to only pass data packets within them, and having a first network node (N1) having a source address (SA) in the first virtual network and being operationally connected to a first port (P1) assigned to the first virtual network by means of the first virtualization tag (T1),
said method comprising the steps of:
monitoring the first network node (N1) in order to detect a predetermined condition, and
on detection of the predetermined condition, reassigning the first port (P1) to the second virtual network by means of assigning the second virtualization tag (T2) to the first port (P1), such that no data packet can be passed from the first network node (N1) to a second network node (N2) connected to a second port (P2) assigned to the first virtual network by means of the first virtualization tag (T1) directly and keeping of the source address (SA) for the first network node (N1) in the second virtual network.

10. Computer program product comprising a computer-readable medium embodying program instructions executable by at least one processor to perform a method for operating virtual networks, comprising a first virtual network comprising a first set of network ports assigned to a first virtualization tag (T1) and a second virtual network comprising a second set of network ports assigned to a second virtualization tag (T2), the first and the second virtual networks having compatible address ranges and being adapted to only pass data packets within them, and having a first network node (N1) having a source address (SA) in the first virtual network and being operationally connected to a first port (P1)

assigned to the first virtual network by means of the first virtualization tag (T1) and having an address translator operationally connected to a first translator port (P4) assigned to the first virtual network by means of the first virtualization tag (T1) and a second translator port (P5) assigned to the second virtual network by means of the second virtualization tag (T2), the method comprising the steps of:

sending a data packet comprising a packet header with a destination address (DA) by a transmitter node (N1) connected to a transmitter port (P1) of the second virtual network, marking the data packet by the transmitter port (P1) with the second virtualization tag (T2), determining, if a destination node (N2) with the destination address (DA) of the packet header is comprised in the second virtual network, and on determining that the destination node (N2) is not comprised in the second virtual network, redirecting the data packet to a receiver node (N2, N3) comprised in the first or second virtual network for further processing by transmitting the data packet to the first or second translator port (P4, P5) assigned to the first or second virtualization tag (T1, T2), respectively, through the address translator.

\* \* \* \* \*